UNITED STATES PATENT OFFICE.

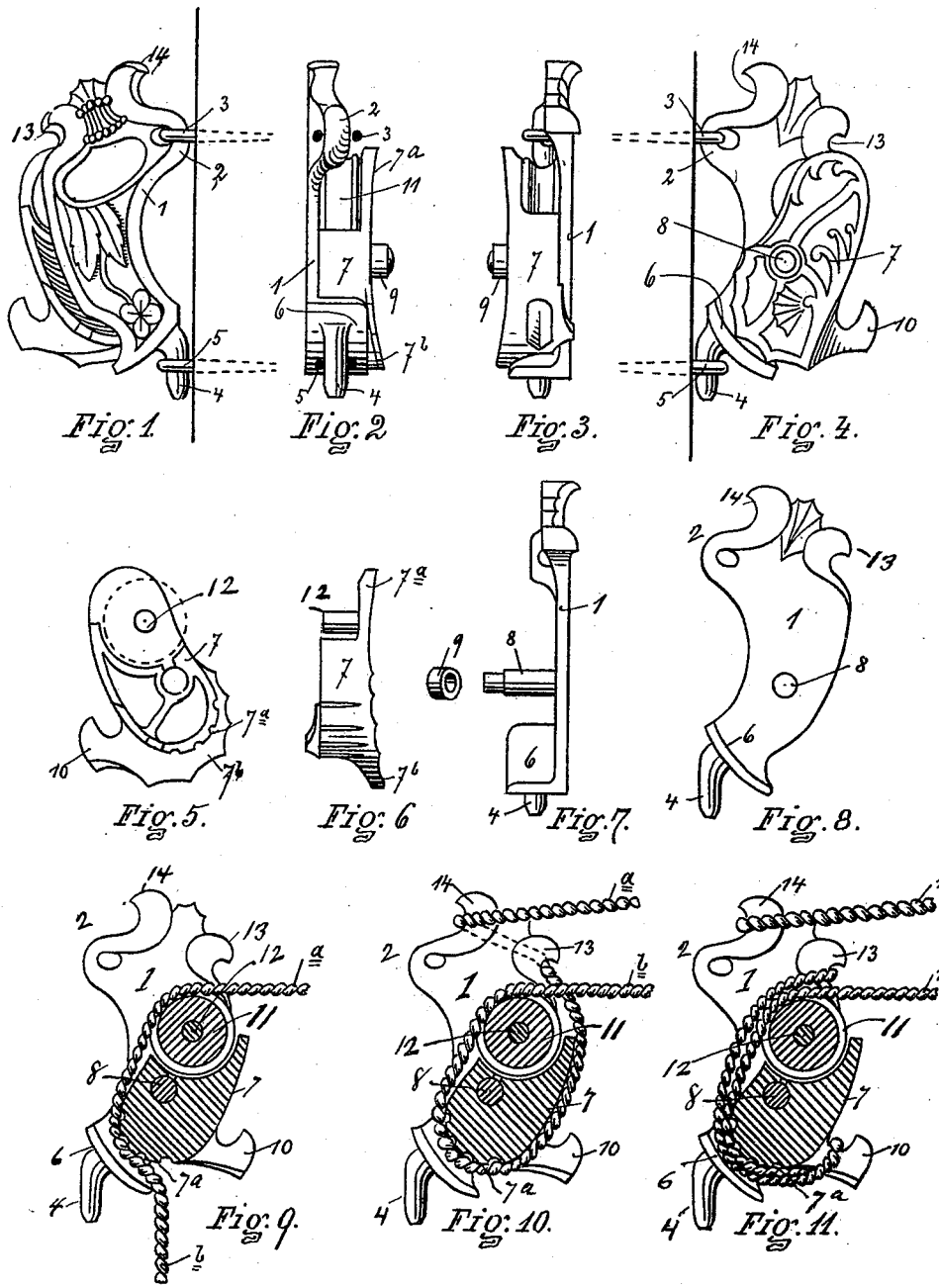

ROBERT AUCOCK, OF UTICA, NEW YORK.

CLOTHES-LINE CLUTCH.

SPECIFICATION forming part of Letters Patent No. 511,492, dated December 26, 1893.

Application filed March 22, 1893. Serial No. 467,150. (No model.)

*To all whom it may concern:*

Be it known that I, ROBERT AUCOCK, of Utica, in the county of Oneida and State of New York, have invented certain new and useful Improvements in Clothes-Line Clutches; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in clothes-line clutches.

In the drawings which accompany and form a part of this specification and in which similar letters and figures of reference refer to corresponding parts in the several views—Figure 1 shows in side elevation my improved clutch. Fig. 2 shows the same from the rear side. Fig. 3 shows the same from the face or front side. Fig. 4 shows the same from the opposite side to that shown in Fig. 1. Fig. 5 shows the inner face of the clutch piece. Fig. 6 shows an edge view of the same piece. Fig. 7 shows an edge view of the body of the device. Fig. 8 shows a side view of the same. Figs. 9, 10 and 11 show the device partially in section with a line secured in various ways by the device.

Referring more particularly to the reference numerals, 1 indicates the clutch body, which is provided at its upper edge with a perforated ear 2 through which is passed a staple 3 by means of which the upper end of the device is secured to a post or wall. On the lower end of the body is provided a pintle projection 4 adapted to be received within the end of the staple 5 by which the device is secured at its lower end to a wall or post or any other suitable support. On the body 1 is provided a fixed clutch face 6 against which the face of the swinging clutch 7 is adapted to act. The clutch piece 7 is mounted upon a pivot 8 secured in or forming a portion of the body 1 and is held on the pivot by means of a washer 9 or other suitable securing device. The swinging clutch piece 7 is provided with a clutching face 7ª adapted to engage on or oppose the fixed clutch face 6, and is also provided with a wing or rib 7ᵇ which diverges from the edge of the clutch plate 6, as shown in Fig. 2. The swinging clutch piece 7 is also provided with a hooked ear or projection 10 on its outer face, the hook being suitable for passing the line around, as hereinafter pointed out. In the upper end of the swinging clutch piece 7 is provided a groove faced roller 11 mounted on a pivotal projection 12. The roller is held between the arm 7ª of the piece 7 and the face of the body piece 1, the roller being held on the pivot by engaging on or lying against the face of the piece 1. A pair of line receiving hooks 13 and 14 is provided on the upper end of the device.

The device may be used as follows: After being secured to a support by means of the staples 3 and 5, a line *a* may be simply secured and held tight by the clutch by passing it over the roller 11 and thence between the clutching shoulder 6 and the clutching face 7ª of the movable clutch piece and drawing it tight; when it is released the clutch piece will turn on the pivot 8 so that the face 7ª will clamp the line tightly against the shoulder 6 securing it. The line may be removed by drawing on the slack end *b* until the clutching piece is relieved, when it may be slid off from the shoulder 6 and removed from the clutch.

The device can be further used where it is desired to continue the line from the clutch to another point, by passing the line around the front side of the movable clutch piece, and thence around the hook projections 13 and 14 and to another point where it may be secured, as fully shown in Fig. 10.

In case it is desired to have the lines secured by the clutch, so that if either line becomes broken or slack, the other line will not be affected, the line is placed in the device as shown in Fig. 11, where it is passed over the pulley 11, thence between the clutching face and shoulder, around the projection and back between the clutching face and shoulder, and thence around the projections 13 and 14 and to another point of support. In this case, if either of the lines, indicated by *m* and *n*, become broken, the other line will be unaffected.

It is evident that numerous alterations and changes in and from the construction herein shown, may be made without departing from the equivalents of my construction.

What I claim as new, and desire to secure by Letters Patent, is—

1. The combination in a line clutch of a body having a clutching shoulder, a pivoted clutch piece having a clutching face on one end and a line roller mounted in the opposite end, and line-holding projections on the upper end of the body above the movable clutch piece, substantially as set forth.

2. In a line clutch, a body 1 having a pivot 8 and a clutching shoulder 6, a swinging clutch piece 7 mounted on the pivot 8 and having a roller 11 mounted in its upper end, a projection 10 in front of the clutching face on the piece 7, and line hooks 13 and 14 on the upper end of the body piece 1, all combined substantially as set forth.

In witness whereof I have affixed my signature in presence of two witnesses.

ROBERT AUCOCK.

Witnesses:
J. G. GIBSON,
GEO. A. GAYMONDS.